United States Patent
Kim et al.

(10) Patent No.: US 9,537,149 B2
(45) Date of Patent: Jan. 3, 2017

(54) METHOD FOR MANUFACTURING A LITHIUM TRANSITION METAL PHOSPHATE

(75) Inventors: Chun Joong Kim, Seoul (KR); Yun Jung Park, Daejeon (KR); Dong Gyu Chang, Daejeon (KR); Ji Ho Park, Daejeon (KR); Woo Young Yang, Daejeon (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 276 days.

(21) Appl. No.: 13/695,342

(22) PCT Filed: Apr. 20, 2011

(86) PCT No.: PCT/KR2011/002816
§ 371 (c)(1),
(2), (4) Date: Oct. 30, 2012

(87) PCT Pub. No.: WO2011/136497
PCT Pub. Date: Nov. 3, 2011

(65) Prior Publication Data
US 2013/0045153 A1    Feb. 21, 2013

(30) Foreign Application Priority Data
Apr. 30, 2010  (KR) .................. 10-2010-0040797

(51) Int. Cl.
*H01M 4/58* (2010.01)
*C01B 25/45* (2006.01)
*B01J 8/10* (2006.01)

(52) U.S. Cl.
CPC .............. *H01M 4/5825* (2013.01); *B01J 8/10* (2013.01); *C01B 25/45* (2013.01); *C01P 2002/72* (2013.01);
(Continued)

(58) Field of Classification Search
CPC ....... C01D 15/00; C01G 45/006; C01G 45/00; C01G 49/009; C01G 49/00; C01G 51/006; C01G 51/00; C01G 53/006; C01G 53/00; C01B 25/26; C01B 25/30; C01B 25/301; C01B 25/375; C01B 25/377; C01B 25/45; C01P 2004/64; B01J 8/10; H01M 4/5825
See application file for complete search history.

(56) References Cited

U.S. PATENT DOCUMENTS

2004/0253170 A1* 12/2004 Zhou et al. ............... 423/592.1
2009/0117020 A1*  5/2009 Manthiram et al. ........ 423/274
(Continued)

FOREIGN PATENT DOCUMENTS

| CN | 1524792 A | 9/2004 |
| CN | 1788836 A | 6/2006 |

(Continued)

OTHER PUBLICATIONS

Google machine translation of CN101693531.*
(Continued)

*Primary Examiner* — Richard M Rump
(74) *Attorney, Agent, or Firm* — Lee & Morse, P.C.

(57) ABSTRACT

Disclosed is a method for manufacturing a lithium transition metal phosphate. The disclosed method for manufacturing a lithium transition metal phosphate comprises the steps of: injecting reaction materials containing lithium, a transition metal, and a phosphate, into a reactor, and mixing the raw materials at the molecular level in the reactor; and allowing the reaction materials to chemically react in the reactor so as to cause nucleation.

9 Claims, 5 Drawing Sheets

(52) U.S. Cl.
CPC ........ *C01P 2004/04* (2013.01); *C01P 2004/60* (2013.01)

(56) References Cited

U.S. PATENT DOCUMENTS

| | | | |
|---|---|---|---|
| 2010/0028236 A1* | 2/2010 | Shen | B82Y 30/00 423/263 |
| 2010/0148114 A1* | 6/2010 | Iizuka et al. | 252/182.1 |

FOREIGN PATENT DOCUMENTS

| | | |
|---|---|---|
| CN | 101142138 A | 3/2008 |
| CN | 101693531 A | 4/2010 |
| DE | 10 2005 012 640 A1 | 9/2006 |
| EP | 0680106 A1 | 11/1995 |
| JP | 1995-130357 A | 5/1995 |
| JP | 2003062440 A | 3/2003 |
| JP | 2004095386 A | 3/2004 |
| JP | 2004533912 A | 11/2004 |
| JP | 2004535930 A | 12/2004 |
| JP | 2008532910 A | 8/2008 |
| JP | 2010510056 A | 4/2010 |
| JP | 2010513193 A | 4/2010 |
| JP | 2011505332 A | 2/2011 |
| JP | 2013501704 A | 1/2013 |
| KR | 1020040094762 A | 11/2004 |
| KR | 1020040096773 A | 11/2004 |
| KR | 1020070112278 A | 11/2007 |
| WO | 02070409 A1 | 9/2002 |
| WO | 03011761 A1 | 2/2003 |
| WO | 2006097324 A2 | 9/2006 |
| WO | 2006097324 A3 | 9/2006 |
| WO | WO 2007034821 A1 * | 3/2007 |
| WO | 2008061632 A1 | 5/2008 |
| WO | 2008077448 A1 | 7/2008 |
| WO | 2009071332 A2 | 6/2009 |
| WO | 2009071332 A3 | 6/2009 |
| WO | 2011019171 A2 | 2/2011 |
| WO | 2011019171 A3 | 2/2011 |

OTHER PUBLICATIONS

Chinese Office Action with English Translation for Application No. 201180021860.8 dated Apr. 11, 2014, citing the above enumerated references.
Written Opinion for International Application No. PCT/KR2011/002816 dated Dec. 27, 2011.
International Search Report with English Translation for International Application No. PCT/KR2011/002816 dated Dec. 27, 2011.
Extended European Search Report dated Mar. 15, 2016 in Corresponding European Patent Application No. 11775202.2.

* cited by examiner

METHOD FOR MANUFACTURING A LITHIUM TRANSITION METAL PHOSPHATE

TECHNICAL FIELD

The present invention relates to a method of preparing lithium transition metal phosphate, and in particular, to a method of preparing lithium transition metal phosphate, wherein the method includes: feeding reactants including lithium, a transition metal, and phosphoric acid into a reactor, mixing the reactants at a molecular level in the reactor; and generating a crystal nucleus by chemically reacting the reactants in the reactor.

BACKGROUND ART

Lithium transition metal phosphate (LiMPO$_4$, where M denotes a transition metal; hereinafter referred to as LMP) is a promising cathode active material for lithium secondary batteries.

As a method of preparing LMP, for example, a solid phase method and a sol-gel method are used.

In a solid phase method, solid-phase reactants are mixed and heated to prepare LMP. However, due to the high heating temperature, it is difficult to obtain uniform nanoparticles. Also, to manufacture such uniform nanoparticles, micro-particle powder reactants are required. Accordingly, a dependency on reactants is high and thus economic efficiency reduces.

Moreover, the solid phase method involves thermal treatment in a reducing condition, which requires particular attention. Due to a low electric conductivity of LMP, to realize battery characteristics, surfaces of LMP particles need to be coated with a conductive material. However, this surface coating is difficult to be implemented with the solid phase method.

In a sol-gel method, a metal alkoxide source material is transformed into a sol state and then gelled through condensation reaction, followed by drying and heating to prepare LMP. However, reactants used in this method are expensive and also, this method is based on an organic solvent. Accordingly, manufacturing costs are high.

DETAILED DESCRIPTION OF THE INVENTION

Technical Problem

The present invention provides a method of preparing a lithium transition metal phosphate, wherein the method includes: feeding reactants including lithium, a transition metal, and phosphoric acid into a reactor, followed by mixing the reactants at a molecular level in the reactor; and generating a crystal nucleus by chemically reacting the reactants in the reactor.

Technical Solution

According to an aspect of the present invention, there is provided a method of preparing lithium transition metal phosphate, the method including: feeding reactants comprising lithium, a transition metal, and phosphoric acid into a reactor, and mixing the reactants at a molecular level in the reactor; and generating a crystal nucleus by chemically reacting the reactants in the reactor.

The transition metal may include at least one selected from the group consisting of Fe, Mn, Co, and Ni.

The chemical reaction may be an acid-base reaction.

The reactants may be fed in at least one of a solution form and a suspension form into the reactor.

The reactants may include an acidic source material and a basic source material, wherein the acidic source material may be fed into the reactor through a first source material feeding line, and the basic source material may be fed into the reactor through a second source material feeding line.

The acidic source material may include lithium, a transition metal, and phosphoric acid, and the basic source material may include an inorganic base.

The acidic source material may include a transition metal and phosphoric acid, and the basic source material may include lithium.

The acidic source material may include lithium and phosphoric acid, and the basic source material may include a transition metal.

The basic source material may include lithium and a transition metal, and the acidic source material may include phosphoric acid.

A time ($T_M$) taken to mix the reactant at the molecular level may be shorter than a time ($T_N$) taken to generate the crystal nucleus.

The time ($T_M$) may be in a range of 10 to 100 μs, and the time ($T_N$) may be 1 ms or less.

An inner temperature of the reactor may be maintained in a range of 0 to 90° C.

A molar ratio of lithium and the transition metal to the phosphoric acid ((Li+M)/phosphoric acid) in the reactants may be in a range of about 1.5 to about 2.5.

A retention time of the reactants in the reactor may be in a range of 1 ms to 10 s.

The reactor may be a high gravity rotating packed bed reactor including: a chamber that defines an inner space; a permeable packed bed that is rotatable, is disposed inside the chamber, and is filled with a porous filler; at least one source material feeding line through which the reactants are fed into the inner space; and a slurry outlet through which a slurry is discharged from the inner space.

The reaction may further include a gas outlet for discharging gas from the inner space.

The porous filler may include titanium.

A centrifugal acceleration of the permeable packed bed may be in a range of 10 to 100,000 m/s$^2$.

The lithium transition metal phosphate may have an olivine type crystal structure.

Advantageous Effects

According to the embodiments of the present invention, a lithium transition metal phosphate preparation method may produce LMP with uniform particle size distribution and high purity in large quantities at low-costs, the method including feeding reactants including lithium, a transition metal, and phosphoric acid into a reactor and mixing the reactants at a molecular level in the reactor; and generating a crystal nucleus by chemically reacting the reactants in the reactor.

BEST MODE

Figure 1:
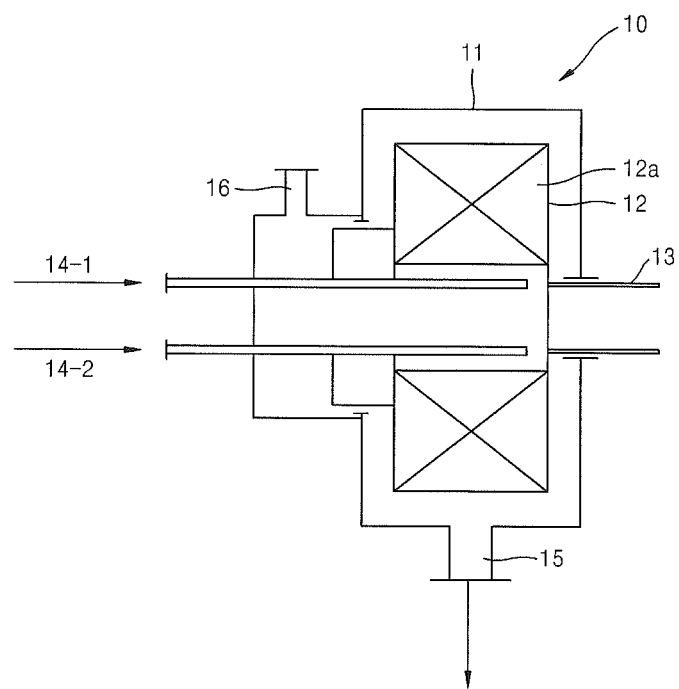
FIG. 1 is a schematic cross-sectional view of a high gravity rotating packed bed reactor that is used in a method of preparing a lithium transition metal phosphate according to an embodiment of the present invention.
Figure 2:
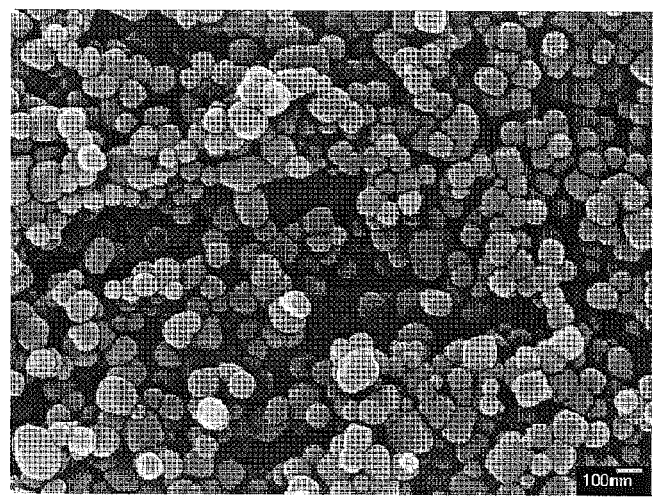
FIG. 2 shows a transmission electron microscope (TEM) image of lithium transition metal phosphate nanoparticles prepared according to Example 1.
Figure 3:
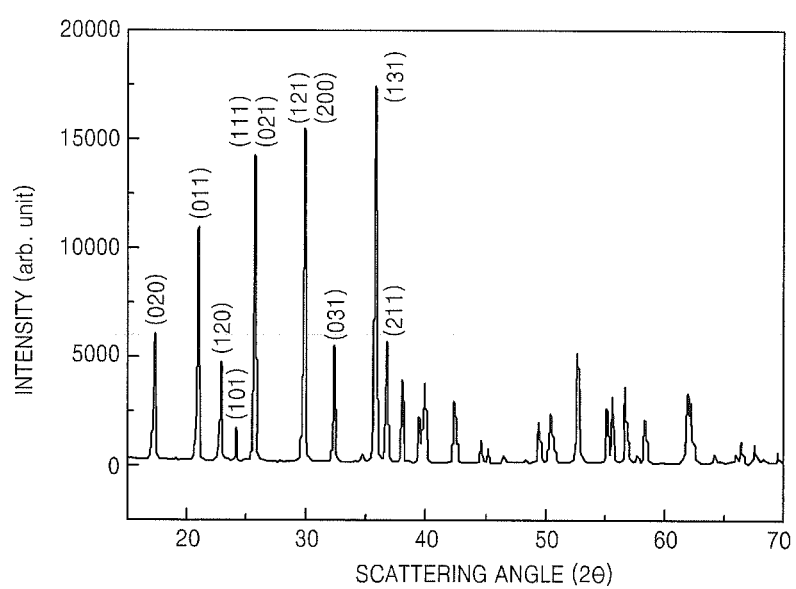
FIG. 3 illustrates an X-ray diffraction (XRD) pattern of the lithium transition metal phosphate nanoparticles prepared according to Example 1.
Figure 4:
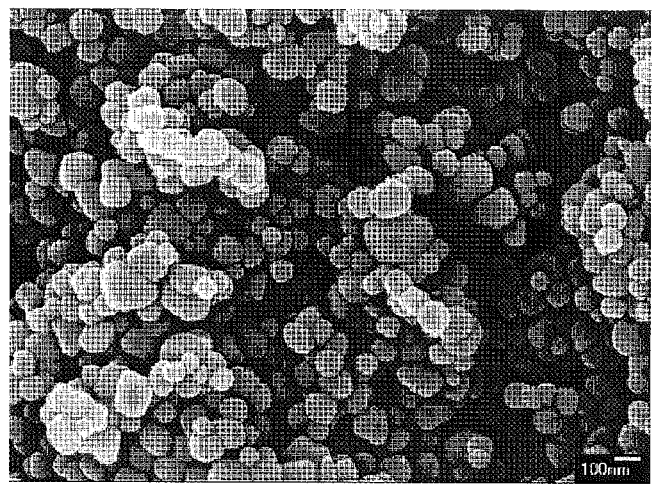
FIG. 4 is a TEM image of lithium transition metal phosphate nanoparticles prepared according to Example 2.
Figure 5:
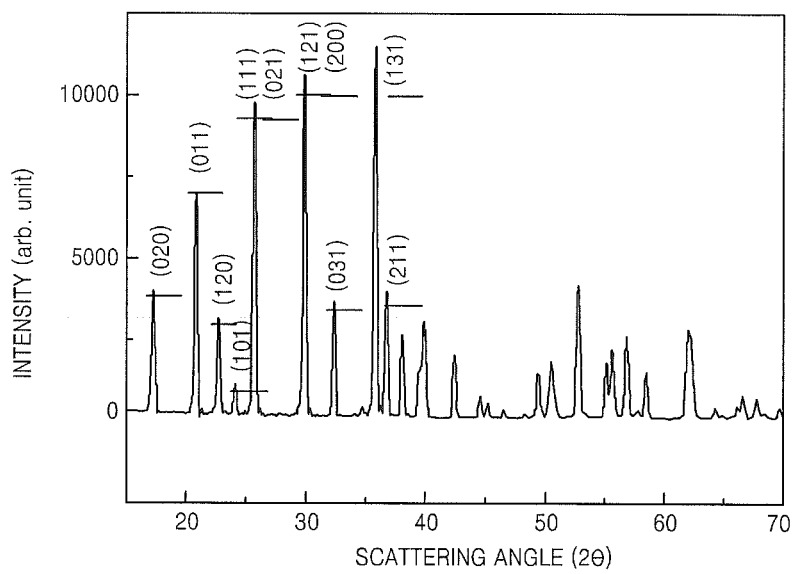
FIG. 5 illustrates an X-ray diffraction pattern of lithium transition metal phosphate nanoparticles prepared according to Example 2.
Figure 6:
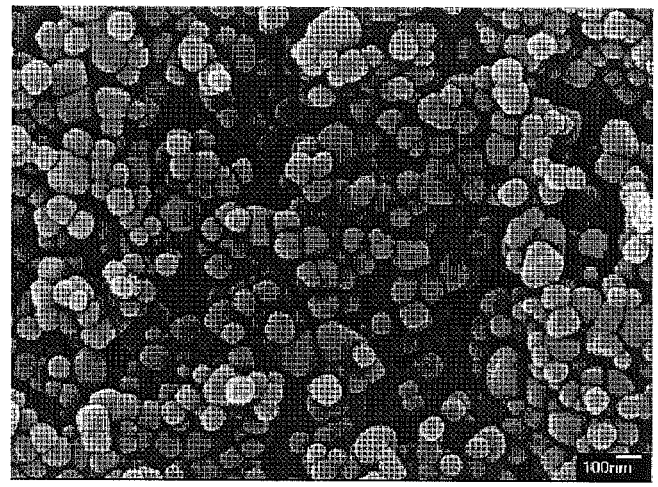
FIG. 6 is a TEM image of lithium transition metal phosphate nanoparticles prepared according to Example 3.
Figure 7:
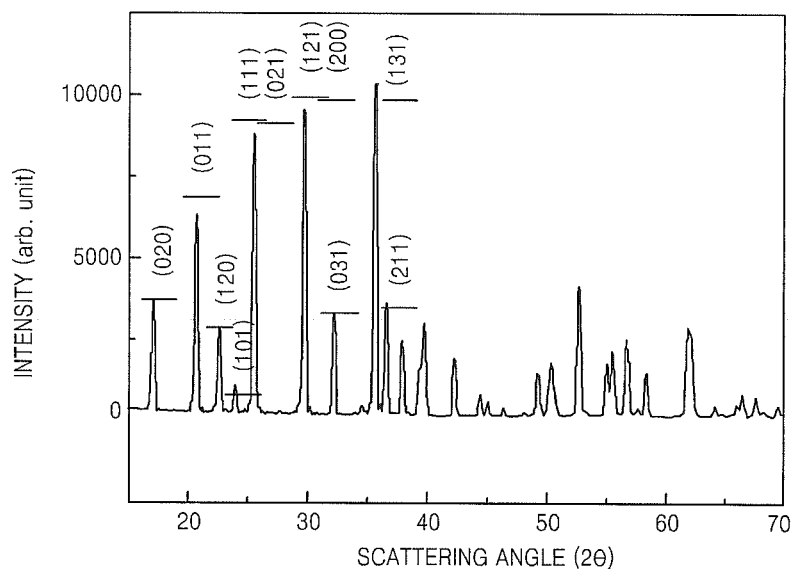
FIG. 7 illustrates an X-ray diffraction pattern of lithium transition metal phosphate nanoparticles prepared according to Example 3.
Figure 8:
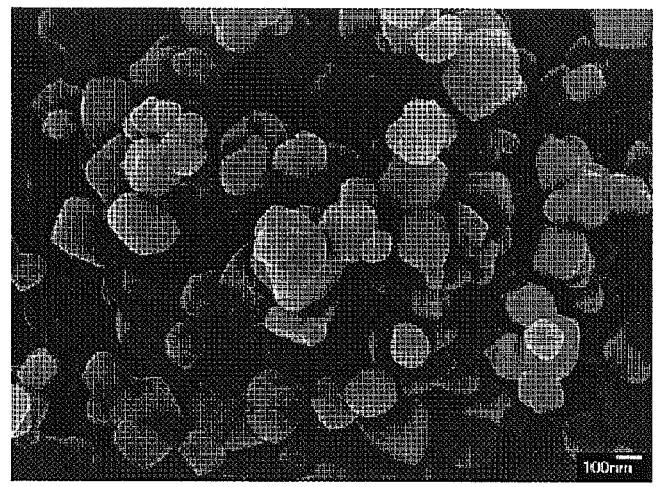
FIG. 8 shows a TEM image of lithium transition metal phosphate nanoparticles prepared according to Example 4.
Figure 9:
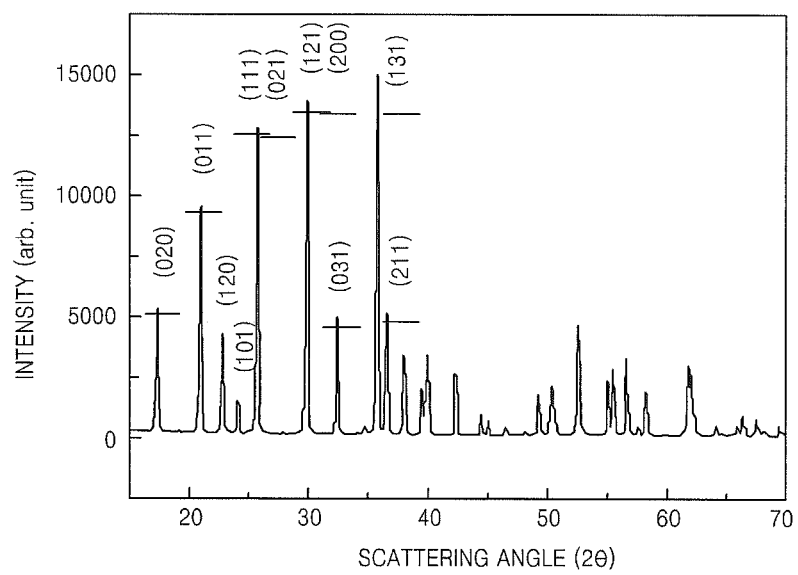
FIG. 9 illustrates an X-ray diffraction pattern of lithium transition metal phosphate nanoparticles prepared according to Example 4.

Hereinafter, methods of preparing lithium transition metal phosphate according to embodiments of the present invention will be described in detail.

A method of preparing lithium transition metal phosphate according to an embodiment of the present invention includes: feeding reactants including lithium, a transition metal, and phosphoric acid into a reactor and mixing the reactants at a molecular level in the reactor; and generating a crystal nucleus by chemically reacting the reactants in the reactor, followed by growing the crystal nucleus into a nano-sized crystal. Thereafter, the resultant slurry obtained from the reaction described above is filtered, washed, dried, and/or heated to prepare nano-sized lithium transition metal phosphate (LMP).

The term 'lithium' used herein refers to a lithium compound, a lithium atom, and/or a lithium ion depending on the context, and the term 'transition metal' used herein refers to a transition metal compound, a titanium metal atom, and/or a transition metal ion depending on the context. The transition metal may include at least one selected from the group consisting of Fe, Mn, Co, and Ni.

Also, the term 'mixing at a molecular level' refers to mixing at a level at which the respective molecules are mixed. Typically, 'mixing' can be classified into as 'macro-mixing' and 'micro-mixing.' The 'macro-mixing' refers to mixing at a vessel scale, and the 'micro-mixing' refers to mixing at a molecular level.

The reactants may be fed in at least one of a solution form and a suspension form into the reactor.

The reactants may include an acidic source material and a basic source material. In this case, the acidic source material may be fed into the reactor through a first source material feeding line and the basic source material may be fed into the reactor through a second source material feeding line. After the acidic source material and the basic source material are respectively fed into the reactor through the first and second source material feeding lines, the acidic source material and the basic source material are respectively mixed at the molecular level in the reactor and then subjected to a chemical reaction, such as an acid-base reaction, to form LMP nanoparticles.

The acidic source material may include lithium, a transition metal, and phosphoric acid. For example, the acidic source material may include lithium chloride, a transition metal chloride, and $H_3PO_4$. The acidic source material may be, for example, a $LiCl/FeCl_2/H_3PO_4$ aqueous solution or an aqueous suspension. In this case, the basic source material may include an inorganic base, such as $NH_4OH$.

The acidic source material may include a transition metal and phosphoric acid. The basic source material may include lithium. For example, the acidic source material may include transition metal chloride, such as $FeCl_2$, and $H_3PO_4$, and the basic source material may include lithium hydroxide, such as LiOH.

The acidic source material may include lithium and phosphoric acid. The basic source material may include a transition metal. For example, the acidic source material may include lithium chloride, such as LiCl, and $H_3PO_4$. The basic source material may include a transition metal hydroxide, such as $Fe(OH)_2$.

The basic source material may include lithium and a transition metal. For example, the basic source material may include lithium hydroxide and a transition metal hydroxide. The basic source material may be, for example, a $LiOH/Fe(OH)_2$ aqueous solution or an aqueous suspension. In this case, the acidic source material may include phosphoric acid, such as $H_3PO_4$, and optionally, another inorganic acid and/or organic acid.

These lithium chloride, transition metal chloride, lithium hydroxide, transition metal hydroxide, and phosphoric acid are relatively inexpensive, and thus may reduce preparation costs of lithium transition metal phosphate nanoparticles.

The chemical reaction may be an acid-base reaction during which one equivalent of an acid is reacted with one equivalent of a base in the reactants and thus the acid and the base in the reactants lose their acidic or basic properties.

A time ($T_M$) taken to mix the reactants at the molecular level may be shorter than a time ($T_N$) taken to generate the crystal nucleus.

The term '$T_M$' used herein refers to a period of time from when the mixing begins to when a composition of the mixture becomes spatially uniform, and the term '$T_N$' used herein refers to a period of time from when the generating the crystal nucleus begins to when the crystal nucleus generation rate reaches an equilibrium, thereby remaining constant.

As described above, by controlling $T_M$ to be shorter than $T_N$, the intermolecular mixing is maximized before the generating the crystal nucleus begins in the reactor. By doing so, nano-sized LMP particles having a uniform particle distribution may be obtained. For example, $T_M$ may be in a range of 10 to 100 μs and $T_N$ may be 1 ms or less. If $T_M$ is less than 10 μs, manufacturing costs may be increased, and if $T_M$ is greater than 100 μs, uniformity of particle sizes may be reduced. Also, if $T_N$ is greater than 1 ms, an appropriate level of reaction may not occur and thus a product yield may become low.

In preparing LMP nanoparticles, an inner temperature of the reactor may be in a range of 0 to 90° C., for example, 20 to 80° C. If the inner temperature is lower than 0° C., an appropriate product yield may not be obtained. If the inner temperature is higher than 90° C., $T_N$ may not be controllable.

Also, a molar ratio of a total of lithium and transition metal (i.e. Li+M) to phosphoric acid ((Li+M)/phosphoric acid) among the reactants may be in a range of 1.5 to 2.5. If the molar ratio ((Li+M)/phosphoric acid) is less than 1.5, a metal phosphate secondary phase such as $LiFeP_2O_7$ and $Fe_4(P_2O_7)_3$ may be deposited on the surfaces of the LMP nanoparticles. If the molar ratio ((Li+M)/phosphoric acid) is greater than 2.5, secondary phases such as $Li_2O$, $Fe_2O_3$, $Fe_2P$, $Li_3PO_4$, and $Li_4P_2O_7$ may be deposited on the surfaces of the LMP nanoparticles.

A retention time of the reactants in the reactor may be in a range of 1 ms to 10 s, for example, 10 ms to 5 s. If the retention time of the reactants is less than 1 ms, an appropriate level of reaction may not occur, and if the retention time of the reactants is greater than 10 s, controlling a particle size of LMP may be difficult and manufacturing costs may be increased.

FIG. 1 is a schematic cross-sectional view of a high gravity rotating packed bed reactor 10 that is used in a method of preparing lithium transition metal phosphate according to an embodiment of the present invention.

The high gravity rotating packed bed reactor 10 may include a chamber 11 delimiting an inner space, a permeable packed bed 12 that is rotatable, is disposed inside the chamber 10, and is filled with a porous filler 12a, at least one source material feeding line through which the reactants are fed into the inner space, and a slurry outlet 15 through which a slurry is discharged from the inner space.

The reactor 10 may further include a gas outlet 16 for discharging a gas from the inner space.

The porous filler 12a may include titanium, which is a strong corrosion-resistant material. For example, the porous filler 12a may be a titanium foam.

The permeable packed bed 12 may be filled with the porous filler 12a therein and may allow the reactants fed in a solution or suspension form into the reactor 10 to permeate therethrough, and may be rotatable by a driving axis 13. A centrifugal acceleration of the permeable packed bed 12 may be maintained in a range of 10 to 100,000 $m/s^2$. If the centrifugal acceleration of the permeable packed bed 12 is less than 10 $m/s^2$, an appropriate level of reaction may not occur. Meanwhile, the centrifugal acceleration of the permeable packed bed 12 cannot exceed 100,000 $m/s^2$ in terms of reactor design technology Although the reactor 10 having such a structure operates in an atmospheric condition, because the reactants can be mixed at the molecular level by a high centrifugal force by controlling the rotational speed of the permeable packed bed 12, the reaction may be smoothly performed even at low temperature. That is, because micro droplets of the reactants are well mixed before growth of LMP particles, uniform LMP nanoparticles may be obtained even at low temperature. Use of the continuous reactor 10 ensures production of LMP on a mass scale.

LMP prepared by the method of preparing lithium transition metal phosphate according to any of the embodiments described above may have an olivine-type crystal structure with an average particle size of from about 0.01 μm to about 10 μm, and in some embodiments, from about 0.05 μm to about 0.8 μm. Accordingly, the obtained lithium transition metal phosphate may be used as a cathode active material for a lithium secondary battery.

Hereinafter, one or more embodiments of the present invention will be described in more detail with reference to the following examples. However, these examples are not intended to limit the scope of the present invention.

EXAMPLES

Example 1

(1) 10.0 mol/L of a $NH_4OH$ aqueous solution was prepared.

(2) 2.0 mol/L of a LiCl aqueous solution, 2.0 mol/L of a $FeCl_2$ aqueous solution, and 2.0 mol/L of a $H_3PO_4$ aqueous solution were separately prepared and were then mixed together in a volume ratio of 1:1:1. A molar ratio of (Li+Fe) to $H_3PO_4$ ((Li+Fe)/$H_3PO_4$) in the mixed solution of LiCl/$FeCl_2$/$H_3PO_4$ was 2.

(3) The reactor 10 of FIG. 1 was manufactured by the inventors of the present invention. The reactor 10 has the following specification.

Permeable packed bed 12: a cylinder formed of stainless steel and having an inner diameter of 10 cm, an outer diameter of 30 cm, and a thickness of 10 cm Porous filler 12a: 4 sheets of titanium foam (about 400 pores/m, an outer diameter of 30 cm, an inner diameter of 10.5 cm, and an axis-direction thickness of 2.5 cm)

(4) To prepare LMP nanoparticles, the driving axis 13 of the reactor 10 was rotated to make the permeable packed bed 12 rotate at a rotational speed of 1440 rpm (centrifugal acceleration: 60,000 $m/s^2$) while the inner temperature of the reactor 10 was maintained at a temperature of 80° C.

(5) The LiCl/$FeCl_2$/$H_3PO_4$ mixed solution prepared in the above (2) and the $NH_4OH$ aqueous solution prepared in the above (1) were continuously fed into the reactor 10 through the first source material feeding line 14-1 and second source material feeding line 14-2, respectively, at a flow rate of 30 L/min to prepare LMP nanoparticles.

(6) A slurry including the LMP nanoparticles was discharged through the slurry outlet 15.

(7) The slurry was filtered and washed with water and dried in a drier at a temperature of 120° C. to obtain LMP nanoparticles.

Example 2

LMP nanoparticles were prepared in the same manner as in Example 1, except that after preparation of 4.0 mol/L of a LiOH aqueous solution, 2.0 mol/L of a $FeCl_2$ aqueous solution, and 2.0 mol/L $H_3PO_4$ aqueous solution, the $FeCl_2$ aqueous solution and the $H_3PO_4$ aqueous solution were mixed in a volume ratio of about 1:1 to obtain a $FeCl_2$/$H_3PO_4$ mixed solution, and while the inner temperature of the reactor was maintained at about 60° C., the $FeCl_2$/$H_3PO_4$ mixed solution and the LiOH aqueous solution were continuously fed into the reactor 10 through the first source material feeding line 14-1 and second source material feeding line 14-2 at a flow rate of 40 L/min and 10 L/min, respectively, to obtain LMP nanoparticles, which were then subjected to filtration, washing, and drying. In the present embodiment, a molar ratio of the reactant components fed into the reactor 10, i.e., a molar ratio of (Li+Fe) to $H_3PO_4$ ((Li+Fe)/$H_3PO_4$) was about 2.

Example 3

LMP nanoparticles were prepared in the same manner as in Example 1, except that after preparation of 2.0 mol/L of a LiCl aqueous solution, 2.0 mol/L of a $H_3PO_4$ aqueous solution, and 2.0 mol/L of a $Fe(OH)_2$ aqueous solution, the LiCl aqueous solution and the $H_3PO_4$ aqueous solution were mixed in a volume ratio of about 1:1 to obtain a LiCl/$H_3PO_4$ mixed solution, and while the inner temperature of the reactor was maintained at about 70° C., the LiCl/$H_3PO_4$ mixed solution and the $Fe(OH)_2$ aqueous solution were continuously fed into the reactor 10 through the first source material feeding line 14-1 and second source material feeding line 14-2 at a flow rate of 40 L/min and 20 L/min, respectively, to obtain LMP nanoparticles, which were then subjected to filtration, washing, and drying. In the present embodiment, a molar ratio of the reactant components fed into the reactor 10, i.e., a molar ratio of (Li+Fe) to $H_3PO_4$ ((Li+Fe)/$H_3PO_4$) was about 2.0.

Example 4

LMP nanoparticles were prepared in the same manner as in Example 1, except that after preparation of 4.0 mol/L of a $H_3PO_4$ aqueous solution, 2.0 mol/L of a LiOH aqueous solution, and 2.0 mol/L of a Fe(OH)$_2$ aqueous solution, the LiOH aqueous solution and the Fe(OH)$_2$ aqueous solution were mixed in a 1:1 volume ratio to obtain a LiOH/Fe(OH)$_2$ mixed solution, and while the inner temperature of the reactor was maintained at about 60° C., the $H_3PO_4$ aqueous solution and the LiOH/Fe(OH)$_2$ mixed solution were continuously fed into the reactor 10 through the first source material feeding line 14-1 and the second source material feeding line 14-2, at a flow rate of 10 L/min and 40 L/min, respectively, to obtain LMP nanoparticles, which were then subjected to filtration, washing, and drying. In the present embodiment, a molar ratio of the reactant elements fed into the reactor 10, i.e., a molar ratio of (Li+Fe) to $H_3PO_4$ ((Li+Fe)/$H_3PO_4$) was about 2.0.

Analysis Example

Transmission electron microscopic (TEM) images and X-ray diffraction (XRD) patterns of the lithium transition metal phosphate nanoparticles prepared according to Examples 1-4 and Comparative Example were analyzed, and results therefrom are shown in FIGS. 2 to 9. Specifications and analysis conditions of the TEM and XRD are shown in Table 1 below:

TABLE 1

|  |  | TEM | XRD |
|---|---|---|---|
| Specification | Manufacturer | JEOL | Rikagu |
|  | Model name | 2100F | D/Max-2500VK/PC |
| Analysis conditions |  | 200 kV | CuKa radiation, speed 4° min$^{-1}$ |

Referring to FIGS. 2-9, though prepared from relatively low-price reactants, LMP particles according to the present invention are found to have relatively uniform particle size distributions and nano-sizes. In particular, it is clear from FIGS. 2, 4, 6 and 8 that the LMP particles of Examples 1 to 4 have nano-sizes and uniform particle size distributions. Also, from FIGS. 3, 5, 7 and 9, it was confirmed that the obtained particles are LMP (LiMPO$_4$). For reference, the respective numerals (for example, 100 nm in FIG. 2) shown in FIGS. 2, 4, 6, ad 8 denote lengths of bold bars in the respective images, and the respective numerals (for example, (111) of FIG. 3) shown in FIGS. 3, 5, 7, and 9 indicate facial indices.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing lithium transition metal phosphate, the method comprising:
   feeding reactants comprising an acidic source material and a basic source material into a reactor, and mixing the reactants at a molecular level in the reactor;
   generating a crystal nucleus by chemically reacting the reactants in the reactor, wherein a time ($T_M$) taken to mix the reactant at the molecular level is shorter than a time ($T_N$) taken to generate the crystal nucleus, and $T_M$ is in a range of 10 to 100 μs and $T_N$ is 1 ms or less;
   growing the crystal nucleus into a nano-sized crystal to obtain a slurry comprising a lithium transition metal phosphate; and then
   filtering, washing, drying and/or heating the slurry to prepare a nanoparticle lithium transition metal phosphate,
   wherein the acidic source material is fed into the reactor through a first source material feeding line and the basic source material is fed into the reactor through a second source material feeding line,
   wherein the acidic source material comprises lithium, a transition metal, and phosphoric acid, and the basic source material comprises an inorganic base; the acidic source material comprises a transition metal and phosphoric acid, and the basic source material comprises lithium; the acidic source material comprises lithium and phosphoric acid, and the basic source material comprises a transition metal; or the basic source material comprises lithium and a transition metal, and the acidic source material comprises phosphoric acid,
   wherein the reactor is a high gravity rotating packed bed reactor including:
   a chamber that defines an inner space;
   a permeable packed bed that is rotatable, is disposed inside the chamber, and is filled with a porous filler;
   at least one source material feeding line through which the reactants are fed into the inner space; and
   a slurry outlet through which a slurry is discharged from the inner space.

2. The method of claim 1, wherein the transition metal comprises at least one selected from the group consisting of Fe, Mn, Co, and Ni.

3. The method of claim 1, wherein the chemical reaction is an acid-base reaction.

4. The method of claim 1, wherein the reactants are fed in at least one of a solution form and a suspension form into the reactor.

5. The method of claim 1, wherein an inner temperature of the reactor is maintained in a range of 0 to 90° C.

6. The method of claim 1, wherein a molar ratio of lithium and the transition metal to the phosphoric acid ((Li+M)/phosphoric acid) in the reactants is in a range of about 1.5 to about 2.5.

7. The method of claim 1, wherein a retention time of the reactants in the reactor is in a range of 1 ms to 10s.

8. The method of claim 1, wherein a centrifugal acceleration of the permeable packed bed is in a range of 10 to 100,000 m/s$^2$.

9. The method of claim 1, wherein the lithium transition metal phosphate has an olivine type crystal structure.

* * * * *